US011895688B2

(12) United States Patent
Khosravirad et al.

(10) Patent No.: US 11,895,688 B2
(45) Date of Patent: Feb. 6, 2024

(54) HYBRID MACRO DIVERSITY AND COOPERATIVE RELAYING METHOD OF ULTRA-RELIABLE AND REAL-TIME MULTI-USER COMMUNICATION

(71) Applicant: Nokia Technologies Oy, Espoo (FI)

(72) Inventors: Saeed Reza Khosravirad, Toronto (CA); Harish Viswanathan, Morristown, NJ (US)

(73) Assignee: Nokia Technologies Oy, Espoo (FI)

( * ) Notice: Subject to any disclaimer, the term of this patent is extended or adjusted under 35 U.S.C. 154(b) by 431 days.

(21) Appl. No.: 17/259,599

(22) PCT Filed: Jul. 12, 2018

(86) PCT No.: PCT/US2018/041742
§ 371 (c)(1),
(2) Date: Jan. 12, 2021

(87) PCT Pub. No.: WO2020/013824
PCT Pub. Date: Jan. 16, 2020

(65) Prior Publication Data
US 2022/0369325 A1    Nov. 17, 2022

(51) Int. Cl.
*H04W 72/12*     (2023.01)
*H04W 72/542*    (2023.01)
*H04W 72/121*    (2023.01)

(52) U.S. Cl.
CPC ....... *H04W 72/542* (2023.01); *H04W 72/121* (2013.01)

(58) Field of Classification Search
CPC ................. H04W 72/542; H04W 72/121
USPC ........................................... 370/329
See application file for complete search history.

(56) References Cited

U.S. PATENT DOCUMENTS

| | | | |
|---|---|---|---|
| 2009/0316815 A1 | 12/2009 | Glazko et al. | ............. 375/260 |
| 2016/0315726 A1 | 10/2016 | Sandberg et al. | |
| 2018/0092017 A1 | 3/2018 | Freda et al. | |
| 2018/0213379 A1* | 7/2018 | Xiong | ........... H04W 4/70 |
| 2022/0014295 A1* | 1/2022 | Bonde | ........... H04J 3/0644 |

* cited by examiner

*Primary Examiner* — Gbemileke J Onamuti
(74) *Attorney, Agent, or Firm* — Harrington & Smith

(57) ABSTRACT

A method is provided including determining a strength of a channel to each of a plurality of user equipments in a wireless multi-user network; scheduling first downlink resources for transmitting first downlink messages to a first group of the user equipments including the user equipments having the strongest channels; and scheduling second resources for transmitting second downlink messages to a second group of the remaining user equipments using a combination of broadcasting and cooperative relaying.

19 Claims, 9 Drawing Sheets

800: RECEIVING, AT A FIRST USER EQUIPMENT IN A MULTI-USER NETWORK COMPRISING A PLURALITY OF USER EQUIPMENTS, DOWNLINK INFORMATION COMPRISING AT LEAST:

- AN INDICATION OF AT LEAST ONE RESOURCE SCHEDULED FOR THE FIRST USER EQUIPMENT OF A PLURALITY OF RESOURCES, WHEREIN THE PLURALITY OF RESOURCES COMPRISE FIRST RESOURCES CONFIGURED FOR COMMUNICATING FIRST DOWNLINK MESSAGES TO A FIRST DOWNLINK GROUP OF THE USER EQUIPMENTS HAVING THE STRONGEST CHANNELS, AND SECOND RESOURCES FOR COMMUNICATING SECOND DOWNLINK MESSAGES TO A SECOND DOWNLINK GROUP OF THE USER EQUIPMENTS THAT ARE NOT IN THE FIRST DOWNLINK GROUP BASED ON A COMBINATION OF BROADCASTING AND COOPERATIVE RELAYING, AND
- AN INDICATION OF WHETHER THE FIRST USER EQUIPMENT IS IN EITHER THE FIRST DOWNLINK GROUP OR THE SECOND DOWNLINK GROUP

802: TRANSMITTING AND/OR RECEIVING ONE OR MORE OF THE FIRST AND/OR SECOND DOWNLINK MESSAGES IN ACCORDANCE WITH THE DOWNLINK INFORMATION

FIG. 8

HYBRID MACRO DIVERSITY AND COOPERATIVE RELAYING METHOD OF ULTRA-RELIABLE AND REAL-TIME MULTI-USER COMMUNICATION

CROSS REFERENCE TO RELATED APPLICATION

This patent application is a U.S. National Stage application of International Patent Application Number PCT/US2018/041742 filed Jul. 12, 2018, which is hereby incorporated by reference in its entirety.

TECHNICAL FIELD

Various example embodiments relate generally to wireless communications and, more specifically, relates to multi-user wireless communications.

BACKGROUND

Currently standard and product development for ultra-reliable low latency communication (URLLC) target a reliability requirement of $10^{-5}$ to $10^{-9}$ within a limited time budget of 1-2 m (such as for $5^{th}$ Generation (5G)/New Radio (NR) networks for example).

For example, the 3rd Generation Partnership Project (3GPP) Radio Access Network (RAN) has mainly focused on requirements of 1 ms latency and $10^{-5}$ reliability. Some use cases may require more stringent requirements. For example, industrial automation use cases, such as motion control, are expected to require higher reliability, for example, $10^{-9}$ reliability for periodic traffic patterns as stated in 3GPP SA1 requirements. It is expected that these more stringent requirements will be adopted by other 3GPP groups in future releases.

Thus, it expected that ultra-reliability will continued to be studied in further detail, such as for upcoming 3GPP releases.

BRIEF SUMMARY

This section is intended to include examples and is not intended to be limiting.

In an example of an embodiment, a method is disclosed that includes determining a strength of a channel to each of a plurality of user equipments in a wireless multi-user network; scheduling first downlink resources for transmitting first downlink messages to a first group of the user equipments comprising the user equipments having the strongest channels; and scheduling second resources for transmitting second downlink messages to a second group of the remaining user equipments using a combination of broadcasting and cooperative relaying.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to perform at least the following: determining a strength of a channel to each of a plurality of user equipments in a wireless multi-user network; scheduling first downlink resources for transmitting first downlink messages to a first group of the user equipments comprising the user equipments having the strongest channels; and scheduling second resources for transmitting second downlink messages to a second group of the remaining user equipments using a combination of broadcasting and cooperative relaying.

In another example of an embodiment, an apparatus comprises means for determining a strength of a channel to each of a plurality of user equipments in a wireless multi-user network; means for scheduling first downlink resources for transmitting first downlink messages to a first group of the user equipments comprising the user equipments having the strongest channels; and means for scheduling second resources for transmitting second downlink messages to a second group of the remaining user equipments using a combination of broadcasting and cooperative relaying.

In an example of an embodiment, a method is disclosed that includes receiving, at a first user equipment in a multi-user network comprising a plurality of user equipments, downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and transmitting and/or receiving one or more of the first and/or second downlink messages in accordance with the downlink information.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An example of an apparatus includes one or more processors and one or more memories including computer program code. The one or more memories and the computer program code are configured to, with the one or more processors, cause the apparatus to at least: enable reception, at a first user equipment in a multi-user network comprising a plurality of user equipments, of downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and enable transmission and/or reception of one or more of the first and/or second downlink messages in accordance with the downlink information.

In another example of an embodiment, an apparatus comprises means for receiving, at a first user equipment in a multi-user network comprising a plurality of user equipments, downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and means for transmitting and/or receiving one or more of the first and/or second downlink messages in accordance with the downlink information.

BRIEF DESCRIPTION OF THE DRAWINGS

Some example embodiments will now be described with reference to the accompanying drawings.

FIGS. 8 and 9 are logic flow diagrams for hybrid macro diversity and cooperative relaying method of ultra-reliable and real-time multi-user communication, and illustrate the operation of exemplary methods, a result of execution of computer program instructions embodied on a computer readable memory, functions performed by logic implemented in hardware, and/or interconnected means for performing functions in accordance with various example embodiments.

DETAILED DESCRIPTION

Figure 1:
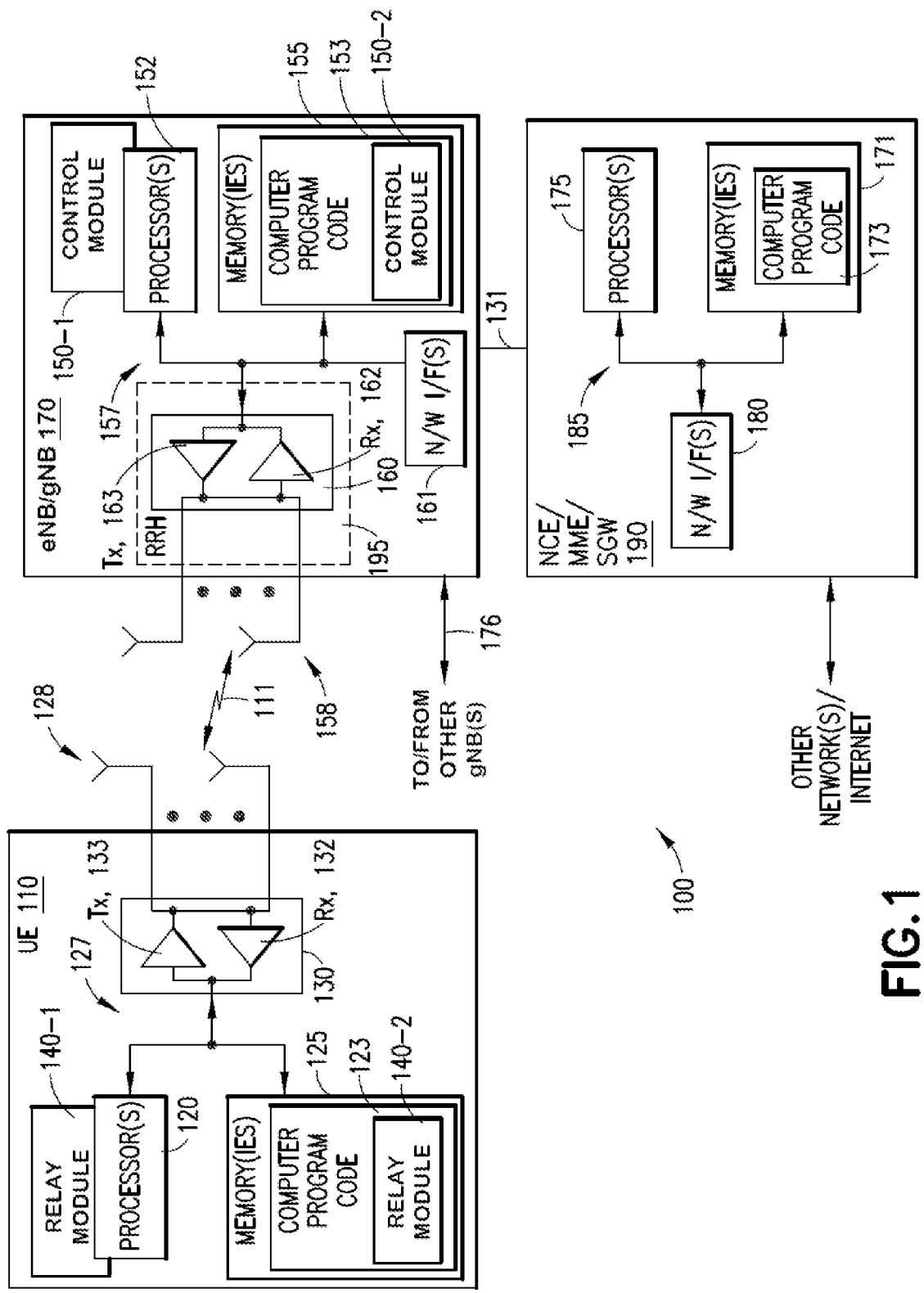
FIG. 1 is a block diagram of one possible and non-limiting exemplary system in which the various example embodiments may be practiced.

The following abbreviations that may be found in the specification and/or the drawing figures are defined as follows:
5G 5th Generation
ARQ automatic repeat request
BS base station
CCH control channel
CDD cyclic delay diversity
CSI channel state information
D2D device to device
DCI downlink control information
DL downlink
eNB evolved Node B (e.g., an LTE base station)
HARQ hybrid automatic repeat request
I/F interface
LOS line of sight
LTE long term evolution
MAC medium access control
MME mobility management entity
N/W network
NCE network control element
NR new radio
RAN radio access network
RRH remote radio head
Rx receiver
SGW serving gateway
SNR signal to noise ratio
TTI transmission time interval
Tx transmitter
UE user equipment (e.g., a wireless, typically mobile device)
UL uplink
URLLC ultra-reliable low-latency communication Features as described herein occasionally refer to LTE terms, however, it is noted that these features may be used in the future with other types of systems (such as New Radio (NR)/5G wireless systems for example). These other wireless systems may be defined by a relevant wireless standard, such as is the case of NR/5G systems for example. In this way, references to, for example, an eNB (i.e. an LTE base station) are equally applicable to future base stations of these other wireless networks (such as, for example, base stations in 5G wireless networks referred to as gNB) unless indicated otherwise. Also, unless indicated otherwise, the terms base station and access point are used interchangeably throughout the description.

Further, although the features are generally described in the context of industrial automation, this is not seen as limiting and it should be understood that the features are applicable generally to multi-user networks. It is noted that a multi-user network generally refers to a network where multiple UE's are connected to a base station (e.g., gNB), as opposed to point-to-point communication where only one transmitter and one receiver node are communicating.

The exemplary embodiments herein describe techniques for hybrid macro diversity and cooperative relaying method of ultra-reliable and real-time multi-user communication. Additional description of these techniques is presented after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a relay module 140, comprising one of or both parts 140-1 and/or 140-2, which may be implemented in a number of ways. The relay module may be implemented in hardware as relay module 140-1, such as being implemented as part of the one or more processors 120. The relay module 140-1 may be implemented also as an integrated circuit or through other hardware such as a programmable gate array. In another example, the relay module may be implemented as relay module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with a eNB/gNB 170 via a wireless link 111.

The gNB 170 is a base station (for example, for 5G/LTE) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a control module, comprising one of or both parts 150-1 and/or 150-2, which may be implemented in a number of ways. The control module may be implemented in hardware as control module 150-1, such as being implemented as part of the one or more processors 152. The control module 150-1 may be implemented also as an integrated circuit or through other hardware such as a programmable gate array. In another example, the control module may be implemented as control module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, for example, link 176. The link 176 may be wired or wireless or both and may implement, for example, an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and a gNB may use multiple carriers. So if there are three 120 degree cells per carrier and two carriers, then the gNB has a total of 6 cells.

The wireless network 100 may include one or more network control elements (NCE) 190. In LTE, for example, the NCE may include MME (Mobility Management Entity) and/or SGW (Serving Gateway) functionality. The NCE 190 may provide connectivity with a further network, such as a telephone network and/or a data communications network (for example, the Internet). The gNB 170 is coupled via a link 131 to the NCE 190. The link 131 may be implemented as, for example, an S1 interface. For 5G wireless systems, the link 131 may represent a 5G interface, such as NG2 or NG3 for example. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Those skilled in the art will appreciate that the various network elements shown in FIG. 1 may be implemented differently in future wireless networks, such as 5G wireless networks. In contrast to LTE, future wireless networks may carry out network functions (NFs) by a plurality of cooperating devices. The different NFs, may include for example, Access and Mobility Function (AMF), Session Management Function (SMF), Policy Control Function (PCF), Application Function (AF), Authentication Server Function (AUSF), User Plane Function (UPF), and User Data Management (UDM). These NFs may be virtualized functions instantiated on an appropriate platform, such as a cloud infrastructure. For example, certain protocols (such as non real-time protocols for example) may be performed by one or more centralized units (CUs) in a cloud infrastructure, while one or more distributed units (DUs) operate the remaining protocols (e.g. real-time protocols) of the 5G radio interface. In this way, the various NFs may be split between CUs and DUs. Together a CU, underlying DUs, and RRHs may be considered as forming a logical base station (which may be represented by gNB 170 in FIG. 1 for example).

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs), and processors based on a multi-core processor architecture, as non-limiting examples. The processors 120, 152, and 175 may be means for performing functions, such as controlling the UE 110, gNB 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the various exemplary embodiments, the exemplary embodiments will now be described with greater specificity.

In the context of multi-user industrial automation, an industrial controller entity may need to communicate periodic messages to N number of devices through a wireless network. We use $m_i$ to denote the DL message for device i, $1 \leq i \leq N$. The packet size for all the devices can be of the same size or different. It is noted that the packet size may be small per device (e.g., less than 50 Bytes) for use cases such as industrial automation, however, other larger sizes are also possible. The controller entity may be equipped with a single base station (such as a gNB 70 for example) or multiple BSs (such as may be the case for a central-RAN architecture). The controller entity may need to deliver the DL message to every device in a limited time T. The controller entity also may be required to listen to UL messages of multiple devices in a limited time duration of, for example, a fraction of 1 ms.

A reliability requirement is then defined as the chance that all the messages in both directions (i.e. UL/DL) to every device will be delivered successfully. The target for this reliability requirement may be between 99.999% and 99.9999999% and may be defined in a relevant standard for example.

This stringent requirement on ultra-reliability within a limited time budget for industrial automation in an unpredictable environment requires the use of diversity techniques. Due to time limitations, and the need for highly-reliable feedback signaling, ARQ-type retransmission methods are generally not a suitable option with hard deadlines. Therefore, scheduling and MAC layer operation needs to exploit further sources of diversity, namely spatial and multi-user diversity.

Wireless channel fading in industrial plants typically follows Rayleigh fading model or Rician fading with weak LOS. Therefore, more than a few orders of diversity are required in order to guarantee a successful transmission in typical range of signal-to-noise-ratios (SNRs). Furthermore, some of the devices may be deployed behind large machines which may block signals from a significant number of potential access point locations.

Solutions for ultra-reliable communications rely on over-provisioning of the physical and infrastructural resources to guarantee a certain packet decoding success rate, such as increasing number of spatial antennas, increasing bandwidth to gain in frequency diversity, and deploying C-RAN based architectures with multiple access points to increase spatial diversity for example.

For example, one solution exploits distributed spatial diversity by cooperative relaying among the devices to increase reliability of the network. This scheme suggests a two-phase transmission where in the first phase, controller concatenates all the $m_i$ messages and broadcasts it to all the devices, and in the second phase, all the devices who successfully decoded the message will relay the message. A similar approach can be followed in the UL, where each device i broadcasts its message over an orthogonal set of time-frequency resources in the first phase. The controller and the rest of devices will then try to decode the message. Then, in the second phase, all the devices who have decoded the UL message of device i will cooperate to transmit the message to the controller. This approach provides high reliability at the cost of engaging all the devices in retransmission in the second phase which results in overall inefficiency. Moreover, reliability of such transmission scheme is highly sensitive to load, where a sharp rise of outage probability can be experienced at higher loads. Another approach relies on multi-user diversity to provide ultra-reliability over an extended range of load. This approach is based on channel estimation using training pilots and then rate-adaptation based on the estimated channel as is typically done in cellular systems. Such an approach provides a robust reliability against a wide range of loads but does not exploit the spatial diversity that is inherent in cooperative relaying.

Thus, each of these solutions suffer from one or more of the following disadvantages: limited in terms of scalability, inefficient performance, over-provisioning is typically dimensioned to cover the "worst case", resources (such as time, frequency, D2D links, multiple antennas, for example) are then wasted most of the time (i.e., when the channel is good enough) which not only results in in-efficiency but also high sensitivity to increase load in the system.

Various example embodiments describe a novel transmission scheme for ultra-reliable and real-time communication in a multi-user network. The transmission scheme acknowledges the need for cooperative relaying (or any other sources of distributed spatial diversity) to provide reliability in weak channel conditions. However, it combines the spatial diversity gain with the multi-user diversity gain from multi-user networks to enhance reliability and increased scalability. The proposed scheme uses a smart channel-aware allocation of resources which leads to a reduced amount of overprovisioned resources that are required for a target reliability level.

A general overview of a transmission scheme according to some example embodiments is now described.

Figure 2:
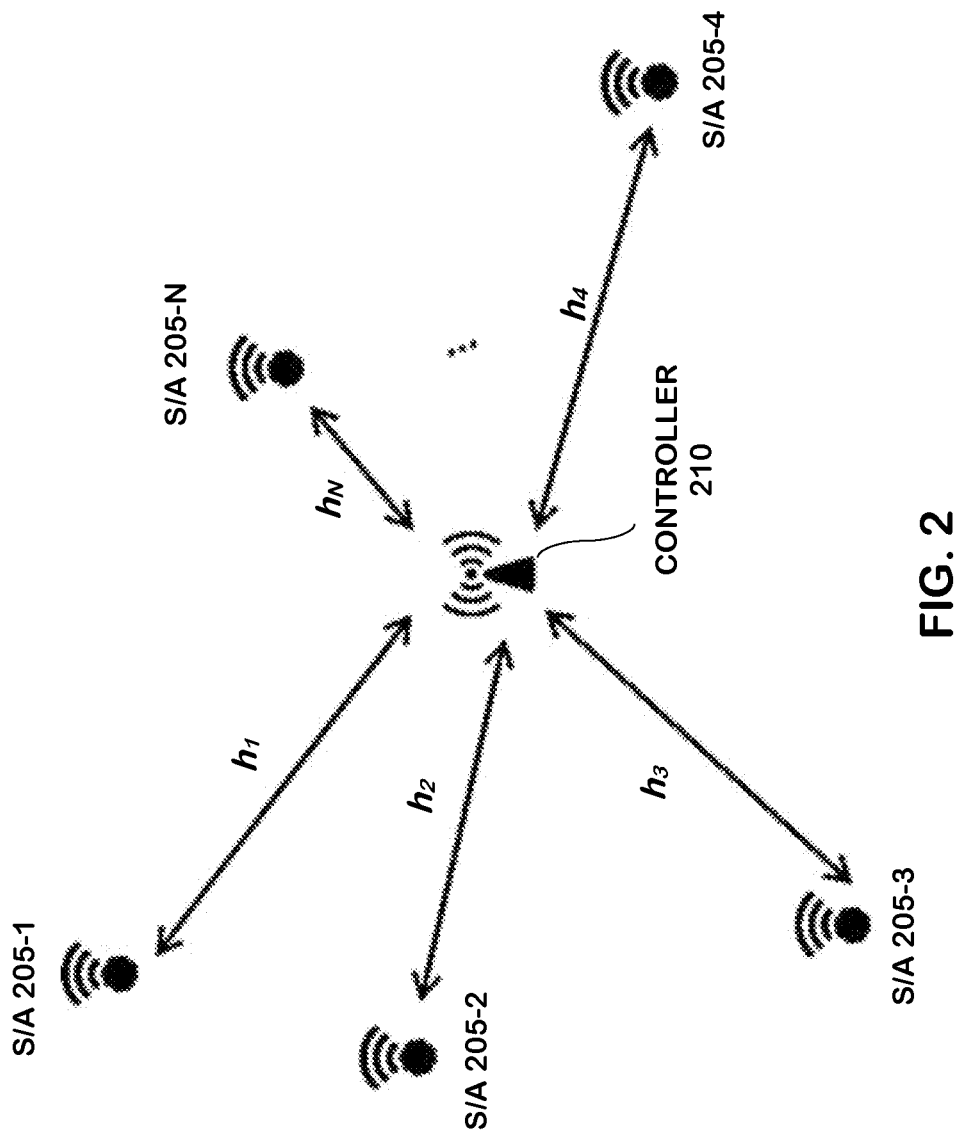
FIG. 2 is an example of a network topology in accordance with various example embodiments described herein.

Referring now to FIG. 2, this figure shows a non-limiting example topology of a network in accordance with various example embodiments. In this example, a controller 210, which may be a network node (for example gNB 170) is wirelessly connected to N devices (namely S/A 205-1 . . . S/A 205-N) over a wireless channel (denoted $h_1$ to $h_N$). The devices may be implemented similarly as shown for UE 110 in FIG. 1 for example.

According to some example embodiments, the controller 210 estimates a channel to each of the N devices. The channel estimation is performed, for example, using channel estimation pilot signals (such as reference symbols, demodulation reference symbols, and/or the like). The controller 210 may then decide on a value of a parameter S based on some pre-defined rule, where the value of S corresponds to the number of devices with the strongest channels. The remaining devices (i.e. N−S) are then grouped as poor-channel devices.

DL transmission may occur in three steps, each over an orthogonal set of resources, as follows:
1. Transmission of control and messages to the S devices in the strong group, using rate adaptation based on the estimated channel (in practice, this step can be the first, second or third in the order of three steps). For example, the estimated channel may be a signal to noise ratio and/or signal to interference and noise ratio.
2. Broadcasting messages of all the devices with poor channels plus the control channel information.
3. Controller, and devices that successfully decode the messages in step 2, cooperate to transmit the messages from step 2 using a distributed cooperation scheme.

The distributed cooperation scheme (also referred to herein as a cooperative relaying scheme) may be a cyclic delay diversity or any other suitable type of distributed diversity technique (for example, distributed space time or space frequency code, such as CDD, or simultaneous transmission such as in SFN).

It is noted that the three steps explained above may be further extended to four or more steps. For instance, the relaying step 3 can be repeated as step 4, 5 and so on, in a multi-hop (instead of 2-hop) manner. Further details regarding DL and UL operations in accordance with example embodiments are discussed below.

It is noted that in other embodiments, the network controller 210 may be wirelessly connected to a gNB, such as the same gNB that the N devices are connected to. In this case, the transmission may be performed as follows:
UL transmission from the controller to the gNB that includes one or more control instructions that the controller wants to send to the devices, such as instruction(s) to the devices to perform some action for example;
DL transmission of the control instructions to N devices;
One or more devices perform some action in accordance with the control instructions (such as moving a robotic arm or spinning a wheel for example);
UL transmission of the status report from devices to gNB; and
DL transmission of the status reports by the gNB to controller 210.

The controller may then decide whether additional actions should be taken, and generates additional instructions accordingly. Thus, the above transmission process may be repeated as necessary for these additional instructions.

In some examples, a downlink message intended for a user equipment or an uplink message sent by a user equipment to the network may be relayed by one or more network nodes (such as base stations) and/or one or more user equipments. Further, the multi-user network may include nodes that are deployed specifically for the purpose of relaying such messages in order to boost reliability (generally referred to herein as 'intermediate network nodes'). As an example, an uplink message sent by a user equipment may be relayed to a destination network node by one or more user equipments and/or one or more intermediate network nodes. In this way, the uplink message may be 'indirectly' received by the destination node from the user equipment.

Figure 3:
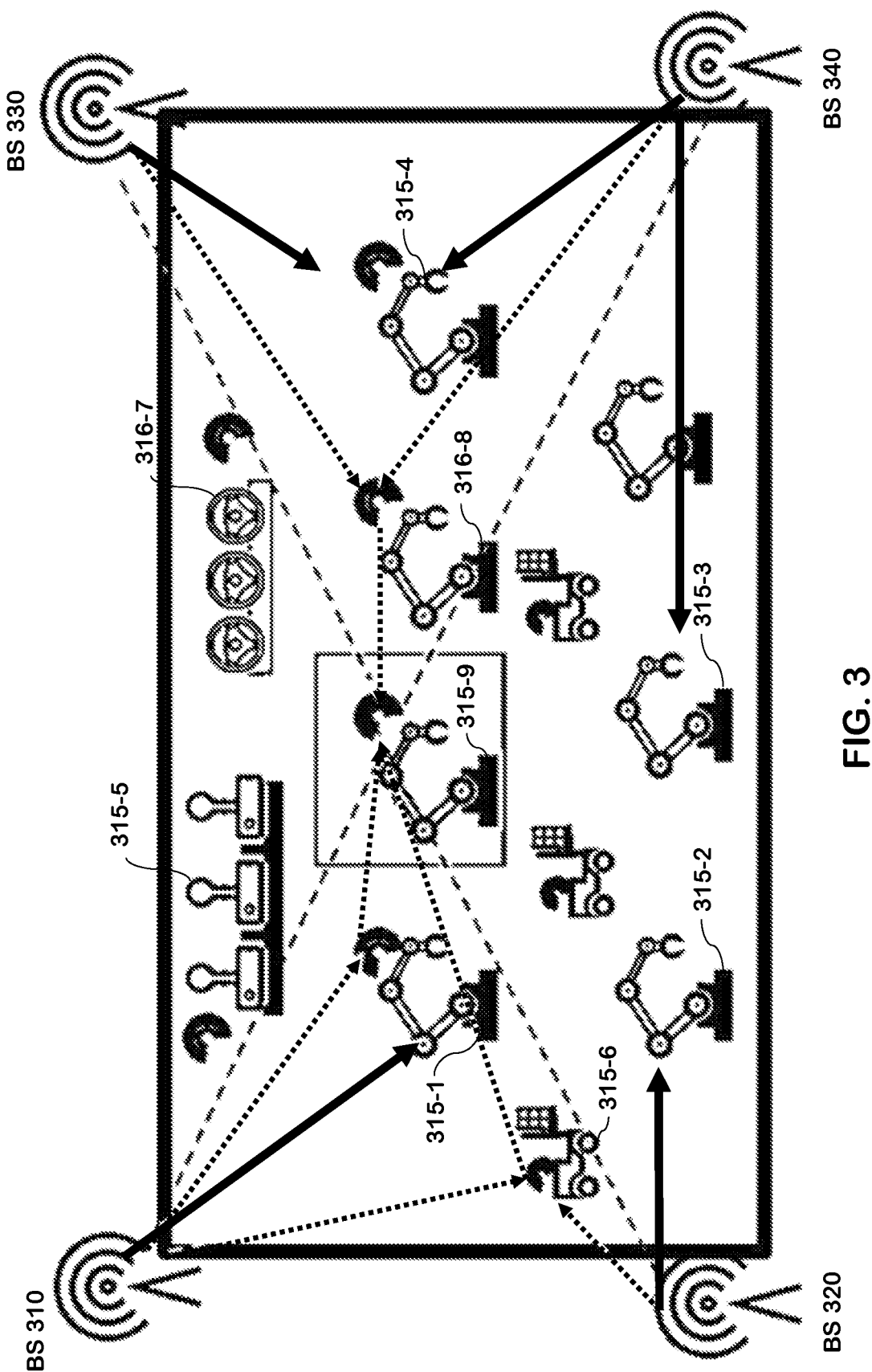
FIG. 3 is a network-centric view of an example transmission scheme in accordance with various example embodiments described herein.

Referring now to FIG. 3, this figure shows a network centric view of a transmission scheme in accordance with some example embodiments. In this example, the there are four base stations (BS) 310, 320, 330, 340 deployed to provide macro diversity in an industrial setting, however more or less base stations may be used. There is also various industrial equipment including equipment 315-1 to 315-9. Each industrial equipment may include or correspond a user equipment (such as UE 110). The various equipment shown in FIG. 3 may be stationary or mobile. The base stations 310, 320, 330, 340 are able to wirelessly communicate (i.e. transmit and/or receive) data packets directly with some of the equipment as represented by the solid arrows. For example: BS 310 is able to communicate directly with equipment 315-1; BS 320 is able to communicate directly with equipment 315-2; BS 330 is able to communicate directly with equipment 315-3; and BS 340 is able to communicate directly with equipments 315-4 and 315-3.

However, other equipment is harder to reach and thus direct communication may not be possible, at least to the degree necessary to meet the requirements for URLLC. This may be due to number of factors such as the distance between the access points and the equipment and whether there is a line-of-sight (LOS) between a base station and the equipment for example. In the example shown in FIG. 3, the LOS (represented by the dashed lines) between each of base stations 310, 320, 330, and 340 and equipment 314-0 is blocked by equipments 315-5, 315-6, 315-7, and 315-8, respectively. Thus, at least for this reason, equipment 315-9 is considered harder to reach, and thus requires 2 hops to receive/and or transmit its packets as represented by the dotted lines. As an example, BS 330 may communicate with equipment 315-9 via equipment 315-8 as discussed in more detail below.

Unless otherwise indicated, the following notation is used to describe the transmission schemes according to various example embodiments.

$N_t$: set of all devices, $|N_t|=N$
$N_s$: set of devices with a strong channel to the access points, $S=|N_s|$
$N_p$: set of all devices with poor channel to the access points, $P=N-S=|N_p|$
$\check{R}=\{\widetilde{R_1}, \ldots, \widetilde{R_S}\}$: set of rates for DL step 1
$\hat{R}=\{\widehat{R_1}, \ldots, \widehat{R_S}\}$: set of rates for UL step 1
$\widetilde{R_{p,2}}, \widetilde{R_{p,3}}$ and $\widehat{R_{p,2}}, \widehat{R_{p,3}}$ are the second and third step rates for DL and UL messages respectively
DL and UL messages, respectively denoted by $\widetilde{m}$ and $\hat{m}$
Total transmission time in each direction, T
Transmission time on step 1, $T_1$
Target system outage probability is denoted by $\varepsilon$, and the system outage probability is denoted by $P_{out}$.

Selectively, the term 'rate-adaptive phase' is used to address UL or DL step 1 of the transmission protocol and the term 'two-hop phase' to address a combination of UL or DL steps 2 and 3.

Figure 4:
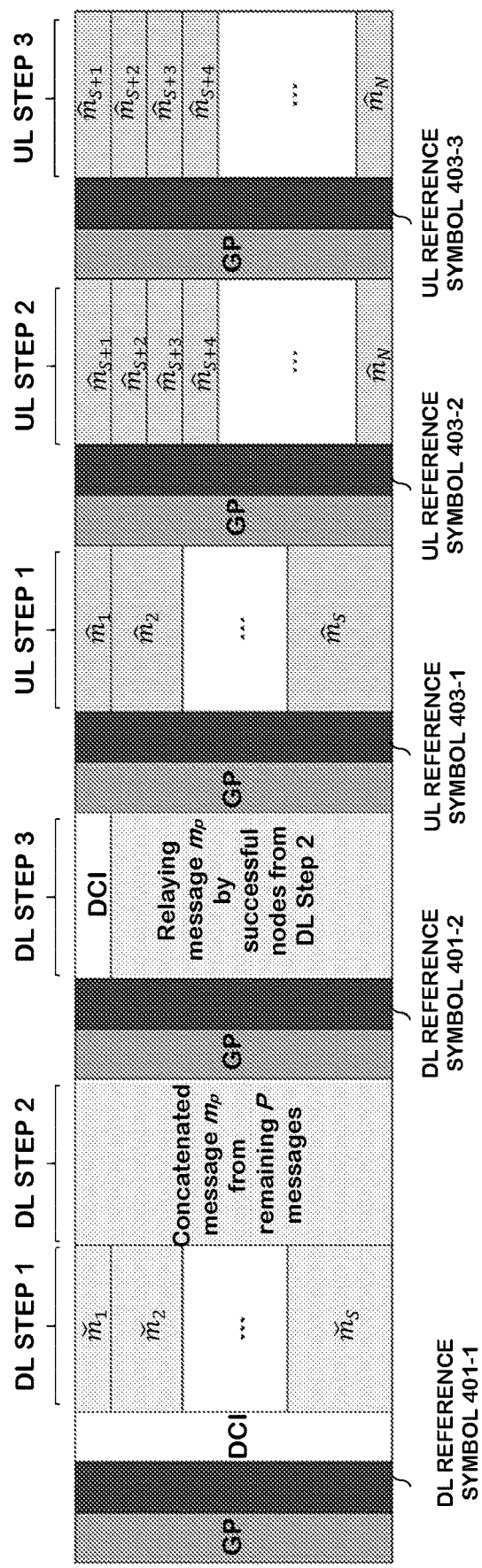
FIG. 4 is an overview of a transmission scheme in accordance with various example embodiments described herein.

Referring now to FIG. 4, this figure shows a non-limiting example of a transmission scheme 400 in accordance with various example embodiments. The transmission scheme 400 is described for a TDD transmission mode, however it is noted that the transmission scheme is also applicable to a FDD mode in which case transmission in each direction will be over a separate frequency band.

The transmission scheme 400 includes three DL steps (i.e. DL step 1, DL step 2, and DL step 3), and three uplink steps (i.e. UL step 1, UL step 2, and UL step 3). Each UL and DL step of the transmission scheme 400 may include its own reference symbol which may be used by the receiver device for equalization and coherent detection. In some example embodiments, the DL reference symbols for step 1 and step 2 of DL direction can be merged if the channel variation is slow as shown in the example in FIG. 4 for example. As those skilled in the art will appreciate, a channel may be considered slowly varying when the channel is "fixed"

during one given time period (for example, a period of at least several successive time slots). In FIG. 4, DL reference symbol 401-1 is a combined reference symbol for DL step 1 and DL step 2; DL reference symbol 401-2 is the reference symbol DL step 3; and reference symbols 403-1, 403-2, 403-3 are reference symbols for step UL steps 1 to 3, respectively.

UL steps 2 and 3 of transmission scheme 400 may follow orthogonal scheduling of devices from a UL set of devices with poor channels. In general, all devices in UL steps 2 and 3 are assumed to be scheduled with the same transmission rate (e.g. the same amount of allocated resources). In some example embodiments, the UL transmission rate for each device in UL step 2 and/or step 3 may be set differently, such as according to their estimated instantaneous channel for example. In this case, the scheduling order may be shared prior to UL step 2 with all of the UL devices.

The scheduling orders of DL and UL parts may be shared with all the devices over the physical channel, which in FIG. 4 is marked as DCI (downlink control information). In order for the transmission scheme to operate reliably, DCI should generally be detected by all devices. To accomplish this, the data rate of the DCI channel may be smaller than or equal to the worst channel from the top S channels, and smaller than the tolerated data rate of the two-hop phase (i.e. steps 2-3).

The transmission scheme 400 also includes guard periods (GP) when switching between phases and directions to avoid intra-cell interference.

Channel state information (CSI) may be gathered at a user device and reported along with that user device's UL message or over a control channel to the network controller. The combination of the CSI collected at the network controller and the reported CSI by the user device can then be used to better estimate the channel between the user device and the network.

The total transmission time in each direction T (meaning the effective time that transmission of data happens) may be non-symmetric. In that case, $T_{dl}$ and $T_{ul}$ are the total transmission time in DL and UL directions, respectively. In such case, the optimization problem for finding $T_1$ in each direction may result in a different solution. The number of devices to be scheduled over the first step in each direction, S, will then be different for each direction. A similar analogy is applicable for when the transmit power between the controller and the devices is not symmetrical.

Techniques to determine the parameters to efficiently implement the above transmission scheme in accordance with various example embodiments are now described.

Network Set Up and Determination of Parameters $T_1$ and S

Figure 5:
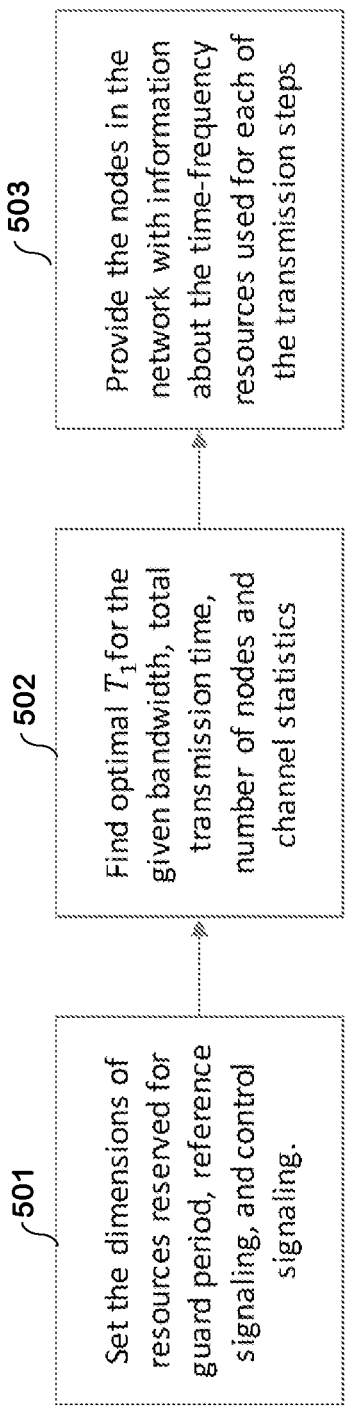
FIG. 5 is a flowchart of an example network setup in accordance with various example embodiments described herein.

FIG. 5 is a flow diagram for setting up a network in accordance with various example embodiments. At step 501, a network controller may set dimensions of resources reserved for guard periods, reference signaling, and control signaling. At step 502, the optimal $T_1$ is determined based on the total transmission time, number of network nodes and user devices in the network, and/or channel statistics. At step 503, the network controller may provide the network nodes and/or user devices in the network with information about the time-frequency resources to be used for each of the transmission steps.

Determining the optimal $T_1$ at step 502 may be performed in an offline process (e.g. a process before the network established). For example, the network controller may set up parameter $T_1$ in order to guarantee a certain outage probability, E, based on the required reliability for the system. Setting $T_1$ is similar to solving an optimization problem that targets different objectives. For example:

To maximize $T_1$ (in other words, to minimize $T-T_1$) with constrained system outage probability:

$$T_1 = \arg\max_{T_1} T_i$$

such that $P_{out}(T_1) \leq \varepsilon$

To minimize overall system outage, $$T_1 = \arg\min_{T_1} P_{out}(T_1)$$

To minimize a given cost function (e.g., total energy consumption of the network) with constrained system outage probability, $$T_1 = \arg\min_{T_1} \text{Cost}(T_1)$$

such that $P_{out}(T_1) \leq \varepsilon$

A larger $T_1$ results in a larger number of user devices that can reliably fit to be scheduled over step 1 which in turn result in a smaller transmission data rate over step 2 and step 3 and a smaller outage of the two-hop phase. However, by increasing $T_1$, the selection diversity gain out of choosing the user devices with the best channels will essentially decrease, which results in a higher chance of failure in the rate-adaptive phase. Therefore, the optimization problem for finding $T_1$ is not trivial. Moreover, depending on the channel fading statistics, the proper value for $T_1$ may vary. For instance, in strong multi-path fading cases, the system requires higher orders of spatial diversity to combat deep fades, meaning a larger set of user devices will be scheduled over $T-T_1$ which requires a smaller $T_1$. On the other hand, when a strong LOS is present, rate adaptation can accommodate more user devices without the need for large cooperative relaying gain, meaning a larger $T_1$ is more appropriate. Channel fading of the environment can be characterized in the offline phase through ray tracing or measurements and may be used to solve the above optimization problem.

The system outage probability can be broken down as follows:

$$P_{out} = \sum_{l=0}^{N-1} P_{fit}(l, T_1) \cdot P_{2h}\left(\frac{\tau(N-l)}{T-T_1}\right),$$

where, assuming (without loss of generality) that $\|h_1\| \geq \|h_2\| \geq \ldots \geq \|h_N\|$ holds for channel gains, and therefore, $R_1 \geq R_2 \geq \ldots \geq R_N$ holds for adapted rate for each user device, $$P_{fit}(0, T_1) = Pr\left\{\frac{1}{R_1} > \frac{T_1}{\tau}\right\} \stackrel{i.i.d.}{\Longrightarrow} \left(Pr\left\{R < \frac{\tau}{T_1}\right\}\right)^N$$

and, $$P_{fit}(l, T_1) = Pr\left\{\sum_{i=1}^{l} \frac{1}{R_i} \leq \frac{T_1}{\tau}, \sum_{i=1}^{l+1} \frac{1}{R_i} > \frac{T_1}{\tau}\right\}$$

-continued $$= Pr\left\{\sum_{i=1}^{l} \frac{1}{R_i} \le \frac{T_1}{\tau}\right\} - Pr\left\{\sum_{i=1}^{l+1} \frac{1}{R_i} \le \frac{T_1}{\tau}\right\}$$

is the chance that only l user devices with the best channels can be fit to be scheduled over $T_1$, and, $P_{2h}(r)$ is the probability that the two-hop phase with N user devices will be in outage for nominal rate r. Moreover, $$\tau = \frac{\text{Load per node}}{\text{Bandwidth}}$$

is a constant.

The value of parameter $T_1$ may be set prior to starting the transmissions based on channel statistics, and shared with all of the user devices and the network nodes in the network.

After choosing $T_1$ for a network, the network controller may then decide on the parameter S in each scheduling instance depending on the estimated instantaneous channels, $\tilde{h}_i$, where, $h_i = \tilde{h}_i + e_i$ and $e_i$ is the estimation error random variable for the ith channel. Then, the value of the parameter S may be chosen as follows.

$$S = \underset{int\,l}{\operatorname{argmax}} l$$

such that $P_{out}(T_1, l) \le \varepsilon$ where, $$P_{out}(T_1, l) = P_{RA}\left(l, T_1 | \{\tilde{h}_i\}\right) \cdot P_{2h}\left(\frac{\tau(N-l)}{T-T_1} | \{\tilde{h}_i\}\right)$$

and, $P_{RA}(l, T_1 | \{\tilde{h}_i\})$ is the probability that the rate-adaptive phase will be in outage over $T_1$ period for l best estimated channels, given the estimated channel variables.

In some example embodiments, the optimization problem to find proper S can be done offline using the above optimization problem but using the following definition:

$$P_{out}(T_1, l) = P_{RA}(l, T_1) \cdot P_{2h}\left(\frac{\tau(N-l)}{T-T_1}\right)$$

Transmission Protocol

After finding S, the following steps may be performed:

Find the top S estimated channels and adapt the transmission rate for each of them based on the estimated channel, e.g., $R_i = \log_2(1 + \|\tilde{h}_i\|^2 \cdot SNR_i)$. It is noted that based on the assumptions and definitions above, we have $$\sum_{i=1}^{S} \frac{1}{R_i} \le \frac{T_1}{\tau}.$$

Scale down the rates $R_i$ for the S best channels according to $\acute{R}_i = \alpha * R_i$, for $0 < \alpha \le 1$ so that $$\sum_{i=1}^{S} \frac{1}{\acute{R}_i} = \frac{T_1}{\tau}.$$

In some embodiments, the rates may be scaled down as follows: find $$\delta = \frac{T_1}{\tau} - \sum_{i=1}^{S} \frac{1}{R_i},$$

then choose $$\acute{R}_i = \left(\frac{1}{R_i} + \frac{\delta}{S}\right)^{-1}.$$

Schedule the S messages for the group of user devices with strong channels over the step 1 resources and transmit.

Schedule the messages for the rest of the user devices over step 2 resources and transmit the messages.

Step 3: Retransmit the messages from step 2 while cooperating with the successful user devices in decoding those messages.

The outage probabilities used in the optimization problems above, namely, $P_{RA}$, $P_{2h}$ and $P_{fit}$ may be difficult to calculate analytically for a generic channel model. They can instead be numerically calculated and used in the offline optimization process. Moreover, the optimization process to find $T_1$ may only be required to be done once for a network prior to set up of the network, while the network controller can find the optimal S either on the run or offline. Therefore, numerical values for the outage probabilities may be calculated and stored at the network controller side.

It is noted that in general, step 1 and step 2 can be orthogonally time-frequency multiplexed over shared resources, in both UL and DL directions. However, according to some embodiments step 3 may only be sequential to step 2 in time.

Figure 6:
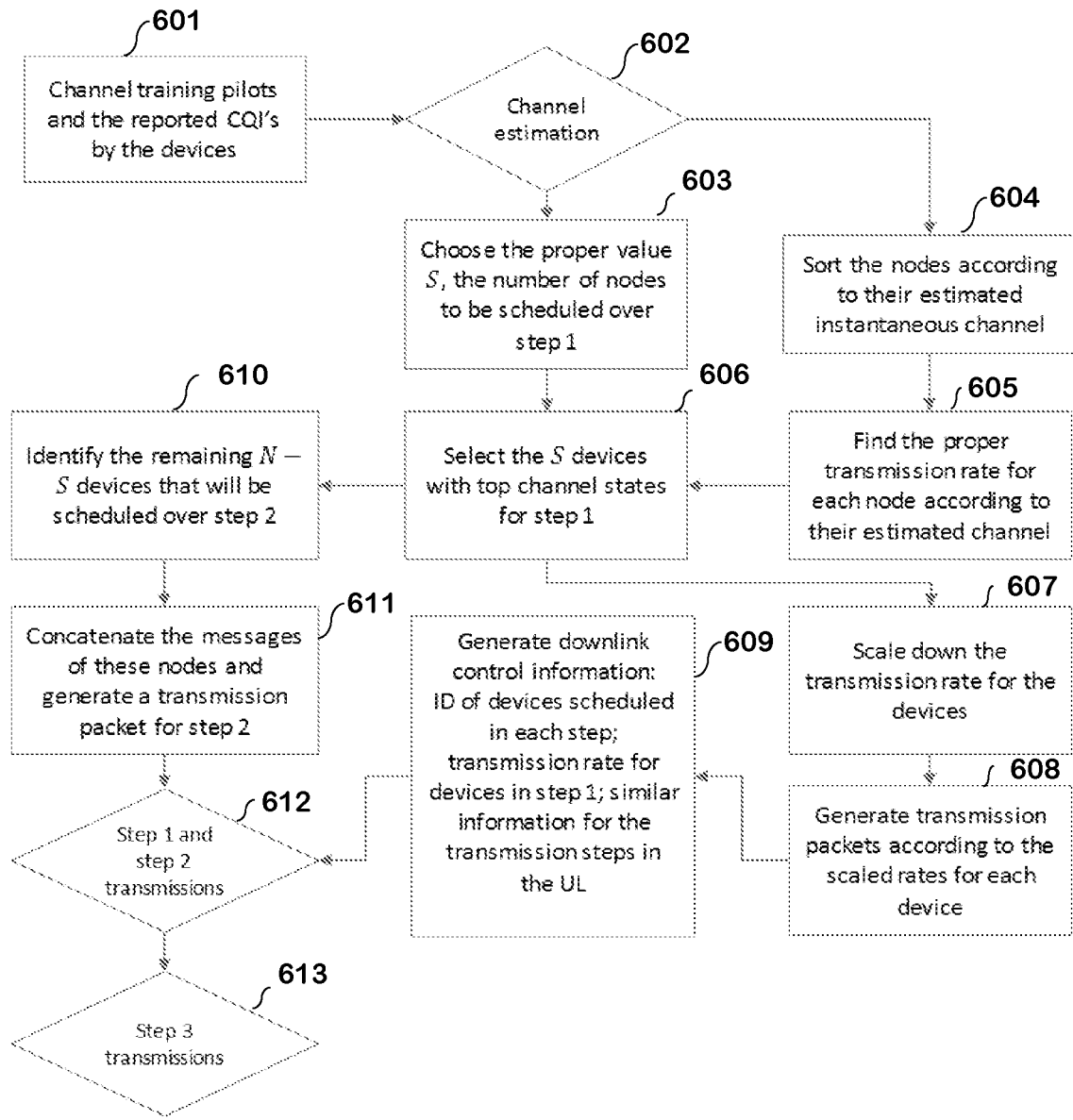
FIG. 6 is a flowchart for different transmission steps in accordance with various example embodiments described herein.

FIG. 6 is a flow diagram for setting up a transmission protocol (such as transmission scheme 400 for example) in accordance with various example embodiments. It is noted that FIG. 6 generally relates to DL operation. At step 601, the network may configure training pilots, and CQI may be received at the network based on the configured training pilots. This information may then be used to estimate the channels between all user devices (e.g. using MMSE or any other channel estimation technique), N, and the network at step 602. In some examples, the reported CQI may be used as a substitute for the channel estimation, or in other examples the reported CQI may be used to improve the channel estimation such as by using techniques like OLLA (outer loop link adaptation) for example. At step 603, the network controller may then determine the proper value, S, to be scheduled over 'step 1', as described above with respect to FIG. 5 for example. A step 604, the user devices are sorted according to their estimated channel instantaneous channel. At step 605, the proper transmission rate for each user device is found according to their respective estimated channel. At step 606, a set of user devices, S, are selected that correspond to the top channel states. At step 607, the transmission rates for the S user devices are scaled down, and transmission packets are generated according to the scaled rates for each of the S user devices. Downlink control information is generated at step 609, which includes the ID of user devices scheduled in each of DL transmission steps, and the transmission rate for user devices in DL step 1. Similar information may also be included in the DCI for the UL transmission steps (such as for UL steps 1, 2, and 3 in FIG. 4 for example). At step 610, the set of remaining user devices, P (i.e. N–S user devices) are identified. The messages of each user device in P are concatenated and a transmission packet is generated at step 611. At step 612, the DL step 1 and DL step 2 transmission are performed, and then the step 3 transmissions are performed at 613. It is noted that in some example embodiments, the DL messages may be encoded separately and transmitted over orthogonal radio resources over step 2 resources.

It is also noted that, unlike step 611 in the DL operation, messages in the UL operation are not concatenated. This is the case as UL messages are transmitted by a distributed set of user devices, where each user devices transmits its own message. Also, for UL operation the user devices may detect the DCI from the DL operation. The DCI may indicate which user devices are included in group S and which devices are not. The DCI may also indicate over which resources the user devices can send their UL message, and over which resources of UL step 3 the devices should relay each message from the nodes in group P. The DCI may also indicate information for CQI and request the devices to report the estimates of their respective channels to the network, e.g., a gNB.

Figure 7:
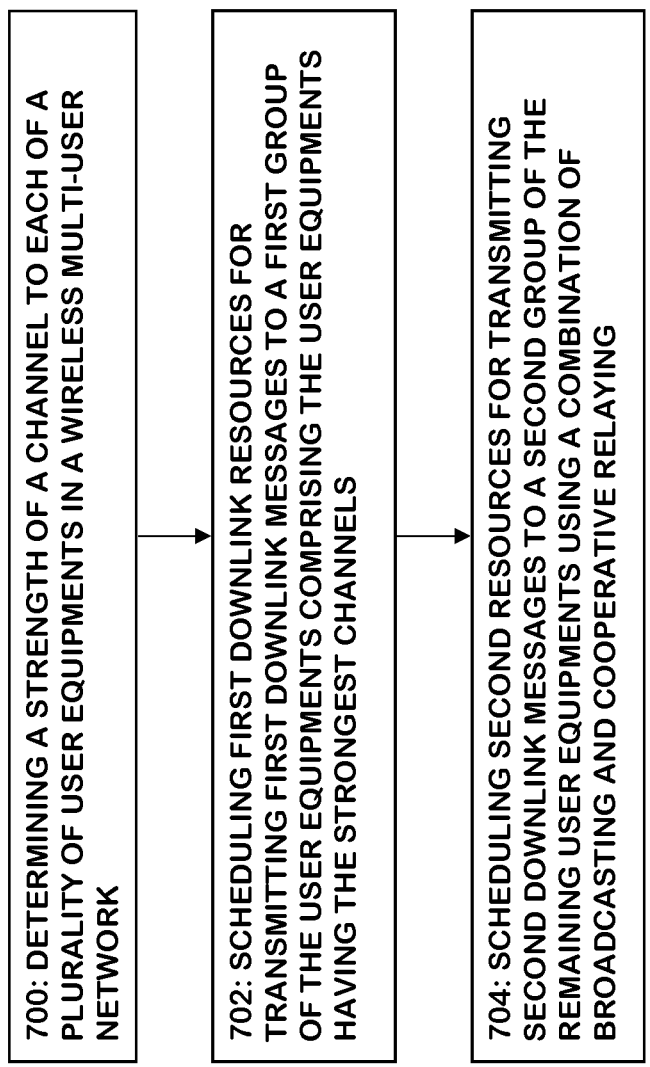
FIG. 7 illustrates a symbol error rate of different diversity orders over a Rician fading channel in accordance with various example embodiments described herein.

FIG. 7 is a logic flow diagram for hybrid macro diversity and cooperative relaying method of ultra-reliable and real-time multi-user communication. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the control module 150-1 and/or 150-2 may include multiples ones of the blocks in FIG. 7, where each included block is an interconnected means for performing the function in the block. The blocks in FIG. 7 are assumed to be performed by a base station such as gNB 170, e.g., under control of the control module 150-1 and/or 150-2 at least in part.

Referring to FIG. 7, according to an example embodiment a method (which may be referred to as example 1) is provided, including: determining a strength of a channel to each of a plurality of user equipments in a wireless multi-user network as indicated by block 700; scheduling first downlink resources for transmitting first downlink messages to a first group of the user equipments comprising the user equipments having the strongest channels as indicated by block 702; and scheduling second resources for transmitting second downlink messages to a second group of the remaining user equipments using a combination of broadcasting and cooperative relaying as indicated by block 704.

An example of a further embodiment (which may be referred to as example 2), is a method as in example 1, wherein the scheduling of the first resources and second resources is based on a number of the user equipment, a number of base stations deployed in the multi-user network, a target system outage probability, and a time budget.

An example of a further embodiment (which may be referred to as example 3), is method as in examples 1 or 2, wherein a size of the first group of user equipments is based on a number of the user equipments and network nodes in the network, instantaneous channel estimates of the channels, a demanded load, and/or a target system outage probability.

An example of a further embodiment (which may be referred to as example 4), is a method as in any one of examples 1-3, wherein the second resources comprise broadcasting resources and cooperative relaying resources, and wherein the method comprises: generating a concatenated message comprising the second downlink messages, and transmitting the concatenated message via the broadcasting resources, wherein the first group of user equipments and/or one or more network nodes are caused to relay concatenated message via the cooperative relaying resources to the second group of the user equipments.

An example of a further embodiment (which may be referred to as example 5), is a method as in any one of examples 1-4, further comprising: transmitting, via the first resources, each of the first downlink messages to the respective user equipments in the first group.

An example of a further embodiment (which may be referred to as example 6), is a method as in any one of examples 1-5, further comprising scheduling third resources for communicating first uplink messages from a first uplink group of the user equipments, and fourth resources for communicating second uplink messages from a second uplink group of the user equipments.

An example of a further embodiment (which may be referred to as example 7), is a method as in example 6, wherein the third resources are scheduled for receiving the first uplink messages from the user equipments in the first uplink group, and the fourth resources comprise resources for indirectly receiving the second uplink messages from the user equipments in the second uplink group via a combination of broadcasting and cooperative relaying.

An example of a further embodiment (which may be referred to as example 8), is a method as in any one of examples 1-7, further comprising transmitting downlink control information indicative of at least one of: time/frequency resources of the scheduled first, second, third, and/or fourth resources; an indication of a type of cooperative relaying to be used; an assignment to a relaying group such that second uplink messages and/or second downlink messages are cooperatively relayed between user equipments assigned to the same relaying group; a list of candidate relay user equipments wherein a second downlink message and/or a second uplink message is relayed only if said message corresponds to a user equipment within the list; one or more rules for each of the user equipments to autonomously decide whether to relay a given second uplink message and/or second downlink message.

An example of a further embodiment (which may be referred to as example 9), is a method as in any one of examples 1-8, wherein scheduling the first resources comprises adapting transmission rates of each of the strongest channels based on the determined strength of the channels to each of the plurality of user equipments in the wireless multi-user network.

According to another example embodiment (which may be referred to as example 10), an apparatus is provided including means for determining a strength of a channel to each of a plurality of user equipments in a wireless multi-user network; means for scheduling first downlink resources for transmitting first downlink messages to a first group of the user equipments comprising the user equipments having the strongest channels; and means for scheduling second resources for transmitting second downlink messages to a second group of the remaining user equipments using a combination of broadcasting and cooperative relaying.

An example of a further embodiment (which may be referred to as example 11), is an apparatus as in example 10, wherein the apparatus further comprises means for performing a method as in any one of examples 2-9.

According to another example embodiment (which may be referred to as example 12), a computer readable medium comprising program instructions is provided for causing an apparatus to perform at least the following: determining a strength of a channel to each of a plurality of user equipments in a wireless multi-user network; scheduling first downlink resources for transmitting first downlink messages to a first group of the user equipments comprising the user equipments having the strongest channels; and scheduling second resources for transmitting second downlink messages to a second group of the remaining user equipments using a combination of broadcasting and cooperative relaying.

An example of a further embodiment (which may be referred to as example 13), is the computer readable medium as in example 12, wherein the program instructions further cause an apparatus to perform a method as in any one of examples 2-9.

According to another example embodiment (which may be referred to as example 14), an apparatus is provided including at least one processor; and at least one memory including computer program code; the at least one memory and the computer program code configured to, with the at least one processor, cause the apparatus at least to: determine a strength of a channel to each of a plurality of user equipments in a wireless multi-user network; schedule first downlink resources for transmitting first downlink messages to a first group of the user equipments comprising the user equipments having the strongest channels; and schedule second resources for transmitting second downlink messages to a second group of the remaining user equipments using a combination of broadcasting and cooperative relaying.

An example of a further embodiment (which may be referred to as example 15), is an apparatus as in example 14, wherein the at least one memory and the computer program code are configured to, with the at least one processor, cause the apparatus at least to perform a method as in any one of examples 2-9.

FIG. 8 is a logic flow diagram for hybrid macro diversity and cooperative relaying method of ultra-reliable and real-time multi-user communication. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the relay module 150-1 and/or 150-2 may include multiples ones of the blocks in FIG. 8, where each included block is an interconnected means for performing the function in the block. The blocks in FIG. 8 are assumed to be performed by the UE 110, e.g., under control of the relay module 140-1 and/or 140-2 at least in part.

Referring to FIG. 8, according to an example embodiment (which may be referred to as example 16) a method is provided including: receiving, at a first user equipment in a multi-user network comprising a plurality of user equipments, downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group as indicated by block 800; and transmitting and/or receiving one or more of the first and/or second downlink messages in accordance with the downlink information as indicated by block 802.

An example of a further embodiment (which may be referred to as example 17), is a method as in example 16, wherein the second resources comprise broadcasting resources and cooperative relaying resources.

An example of a further embodiment (which may be referred to as example 18), is a method as in example 17, wherein the transmitting and/or receiving the one or more of the first and/or second downlink messages comprises, in response to determining that the first user equipment is in the first downlink group: receiving one of the first downlink messages from a network node that is intended for the first user equipment on the first resources in accordance with the downlink information; and receiving a concatenated message on the broadcasting resources via broadcast, wherein the concatenated message comprises the second downlink messages for the second downlink group of user equipments, and relaying the concatenated message to at least one second user equipment in the second downlink group using the cooperative relaying resources.

An example of a further embodiment (which may be referred to as example 19), is a method as in any one of examples 16-18, further comprising: measuring a channel quality of a channel between the first user equipment and a network node based on a reference signal, and transmitting a report of the channel quality to the network node, wherein the indication of whether the first user equipment is in either the first downlink group or the second downlink group is based at least in part on the report.

An example of a further embodiment (which may be referred to as example 20), is a method as in any one of examples 16-19, wherein the plurality of resources further comprises third resources for communicating first uplink messages from a first uplink group of the user equipments, and fourth resources for communicating second uplink messages from a second uplink group of the user equipments, and wherein the method comprises: transmitting and/or receiving one or more of the first and/or second uplink messages based on determination of whether the first user equipment is in either the first uplink group or the second uplink group.

An example of a further embodiment (which may be referred to as example 21), is a method as in example 20, wherein at least one of: the first uplink group is the same as the first downlink group, and the second uplink group is the same as the second downlink group.

An example of a further embodiment (which may be referred to as example 22), is a method as in example 20, wherein at least one of the first uplink group and/or the second uplink group is different than the first downlink group and the second downlink group; and wherein the downlink information is indicative of whether the first user equipment is in either the first uplink group or the second uplink group.

An example of a further embodiment (which may be referred to as example 23), is a method as in any one of examples 20-22, wherein the fourth resources comprise further broadcasting resources and further cooperative relaying resources.

An example of a further embodiment (which may be referred to as example 24), is a method as in example 23, further comprising, in response to determining that the first user equipment is in the first uplink group: generating and transmitting one of the first uplink messages to a network node on the third resources.

An example of a further embodiment (which may be referred to as example 25), is a method as in example 23, further comprising, in response to determining that the first user equipment is in the second uplink group: generating and broadcasting, via the further broadcasting resources, one of the second uplink messages, wherein the generated second uplink message is relayed by one or more of the user equipments and/or one or more intermediate network nodes.

An example of a further embodiment (which may be referred to as example 26), is a method as in any one of examples 23-25 further comprising relaying, via the further cooperative relaying resources, at least one second uplink message broadcasted by at least one user equipment in the second uplink group, wherein the at least one second uplink message was received via the further broadcasting resources.

An example of a further embodiment (which may be referred to as example 27), is a method as in any one of examples 16-26, wherein the downlink information comprises at least one of: time/frequency resources of the scheduled first, second, third, and/or fourth resources; an indication of a type of cooperative relaying to be used; an assignment to a relaying group such that second uplink messages and/or second downlink messages are cooperatively relayed between user equipments assigned to the same relaying group; a list of candidate relay user equipments wherein a second downlink message and/or a second uplink message is relayed only if said message corresponds to a user equipment within the list; one or more rules for the first user equipment to autonomously decide whether to relay a given second uplink message and/or second downlink message; and an indication of a transmission rate to be applied by the first user equipment.

According to another example embodiment (which may be referred to as example 28), an apparatus is provided including means for receiving, at a first user equipment in a multi-user network comprising a plurality of user equipments, downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and means for transmitting and/or receiving one or more of the first and/or second downlink messages in accordance with the downlink information.

An example of a further embodiment (which may be referred to as example 29), is an apparatus as in example 28, wherein the apparatus further comprises means for performing a method as in any one of examples 17-27.

According to another example embodiment (which may be referred to as example 30), a computer readable medium comprising program instructions is provided for causing an apparatus to perform at least the following: enabling reception, at a first user equipment in a multi-user network comprising a plurality of user equipments, of downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and enabling transmission and/or reception of one or more of the first and/or second downlink messages in accordance with the downlink information.

An example of a further embodiment (which may be referred to as example 31), is the computer readable medium as in example 12, wherein the program instructions further cause an apparatus to perform a method as in any one of examples 17-27.

According to another example embodiment (which may be referred to as example 32), an apparatus is provided including at least one processor; and at least one memory including computer program code; the at least one memory and the computer program code configured to, with the at least one processor, cause the apparatus at least to: enable reception, at a first user equipment in a multi-user network comprising a plurality of user equipments, of downlink information comprising at least: an indication of at least one resource scheduled for the first user equipment of a plurality of resources, wherein the plurality of resources comprise first resources configured for communicating first downlink messages to a first downlink group of the user equipments having the strongest channels, and second resources for communicating second downlink messages to a second downlink group of the user equipments that are not in the first downlink group based on a combination of broadcasting and cooperative relaying, and an indication of whether the first user equipment is in either the first downlink group or the second downlink group; and enable transmission and/or reception of one or more of the first and/or second downlink messages in accordance with the downlink information.

An example of a further embodiment (which may be referred to as example 33), is an apparatus as in example 32, wherein the at least one memory and the computer program code are configured to, with the at least one processor, cause the apparatus at least to perform a method as in any one of examples 17-27.

Figure 9:
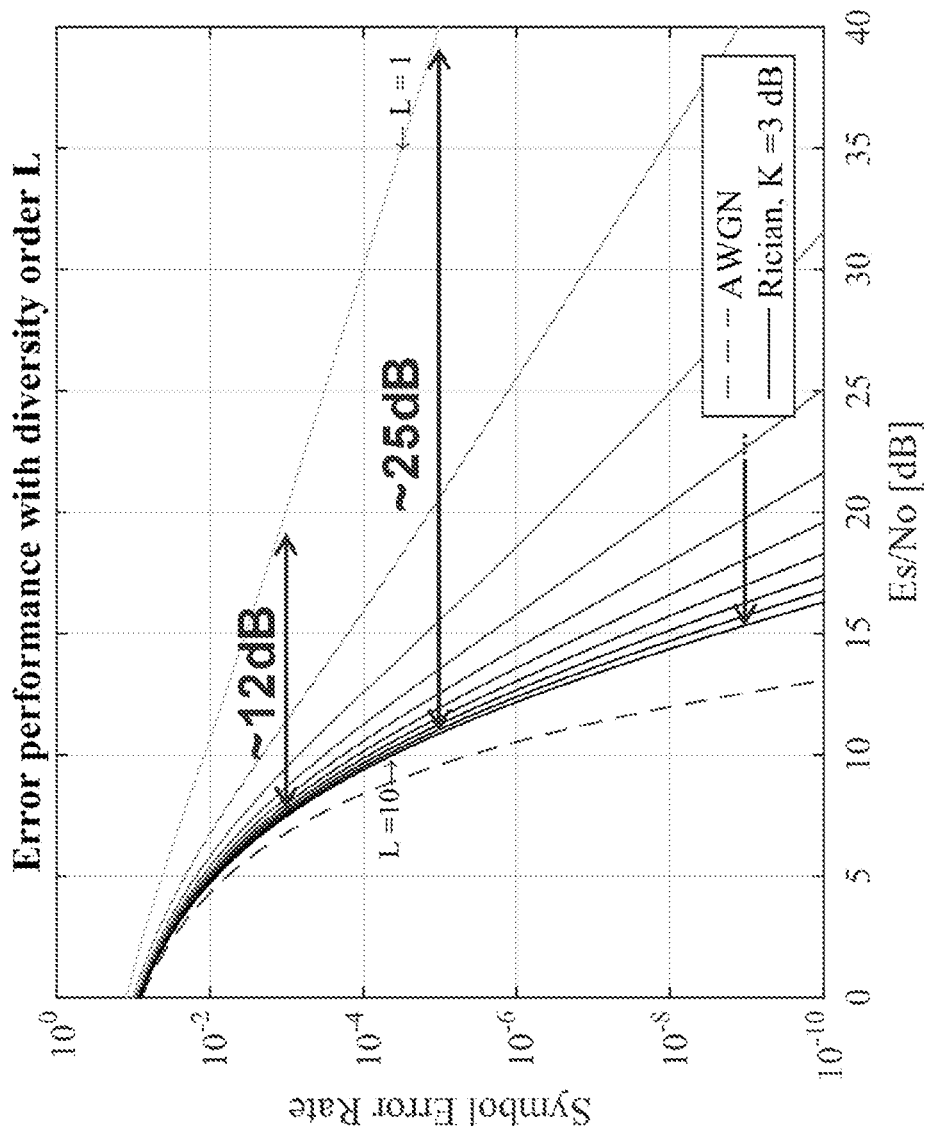

The need for high orders of diversity can explained by looking at FIG. 9, which illustrates the symbol error rate of different diversity orders (denoted by L) over a Rician fading channel. Even with a Rician K factor of 3 dB, a large diversity order is required to be able to operate at $10^{-9}$ outage rate in reasonable SNR level. For instance, with 5 orders of diversity, and considering around 6 dB gain from channel coding, SNR of around 14 dB is required for $1-10^{-9}$ reliability. However, this is without knowing the channel state at the network controller. If the channel is known, and is estimated to be "strong", then reliability can be achieved by proper rate adaptation.

Thus, without in any way limiting the scope, interpretation, or application of the claims appearing below, a technical effect of one or more of the example embodiments disclosed herein is allowing the use of smaller resources in time, frequency and spatial, to accommodate devices with a strong channel to the network controller, which increases efficiency and opens up more room to serve larger loads in the network.

Another technical effect of one or more of the example embodiments disclosed herein is increased reliability over extended range of load by exploiting the diversity gain from taking instantaneous channel into account (i.e., multi-user diversity) and the selection among the devices. Another technical effect of one or more of the example embodiments disclosed herein is dramatically reduce the transmission rate in step 2 and step 3 by scheduling devices with a "strong" channel in step 1. This way, the reliability of the two-hop scheme, which is planned to serve the devices with "poor" channel, will increase while the total amount of consumed energy over relaying phase will decrease.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining, by at least one base station, a strength of a channel to each of a plurality of user equipments in a wireless multi-user network;
   scheduling, by the at least one base station, first downlink resources for transmitting first downlink messages to a first group of the plurality of user equipments comprising user equipments having the strongest channels;
   transmitting, via broadcasting and by the at least one base station, the first downlink messages to the first group of the user equipments using the first downlink resources;
   scheduling, by at least one base station, second downlink resources for transmitting second downlink messages to a second group of remaining user equipments from the plurality of user equipments, wherein the second resources comprise broadcasting resources and cooperative relaying resources;
   transmitting, via broadcasting and by the at least one base station, the second downlink messages to the first and second group of the user equipments using the broadcasting resources; and
   participating, by the at least one base station, in a cooperative relaying scheme at least by transmitting information about the cooperative relaying resources to be used for relaying the second downlink messages at least by user equipments in the first group that successfully decoded the second downlink messages.

2. The method as in claim 1, wherein:
   the method comprises generating a concatenated message comprising the second downlink messages, wherein transmitting the second downlink messages comprises transmitting the concatenated message via the broadcasting resources, and
   the first group of user equipments and/or one or more network nodes are caused to relay concatenated message via the cooperative relaying resources to the second group of the user equipments.

3. The method as in claim 1, further comprising scheduling third resources for communicating first uplink messages from a first uplink group of the user equipments, and fourth resources for communicating second uplink messages from a second uplink group of the user equipments.

4. The method as in claim 3, wherein the third resources are scheduled for receiving the first uplink messages from the user equipments in the first uplink group, and the fourth resources comprise resources for indirectly receiving the second uplink messages from the user equipments in the second uplink group via a combination of broadcasting and cooperative relaying.

5. The method as in claim 4, further comprising transmitting downlink control information indicative of at least one of:
   time/frequency resources of the scheduled first, second, third, and/or fourth resources;
   an indication of a type of cooperative relaying to be used as part of the cooperative relaying scheme;
   an assignment to a relaying group such that second uplink messages and/or second downlink messages are cooperatively relayed between user equipments assigned to the same relaying group;
   a list of candidate relay user equipments wherein a second downlink message and/or a second uplink message is relayed only in response to said second downlink message and/or a second uplink message corresponding to a user equipment within the list; or
   one or more rules for each of the user equipments to autonomously decide whether to relay a given second uplink message and/or second downlink message.

6. The method as in claim 1, wherein scheduling the first resources comprises adapting transmission rates of each of the strongest channels based on the determined strength of the channels to each of the plurality of user equipments in the wireless multi-user network.

7. The method as in claim 1, wherein the participating in a cooperative relaying scheme further comprises transmitting the second downlink messages using the cooperative relaying resources.

8. An apparatus comprising:
one or more processors; and
one or more memories storing instructions that, when executed by the one or more processors, cause the apparatus at least to perform:
determining, by the at least one base station, a strength of a channel to each of a plurality of user equipments in a wireless multi-user network;
scheduling, by the at least one base station, first downlink resources for transmitting first downlink messages to a first group of the plurality of user equipments comprising the user equipments having the strongest channels;
transmitting, via broadcasting and by the at least one base station, the first downlink messages to the first group of the user equipments using the first downlink resources;
scheduling, by the at least one base station, second downlink resources for transmitting second downlink messages to a second group of remaining user equipments from the plurality of user equipments, wherein the second resources comprise broadcasting resources and cooperative relaying resources;
transmitting, via broadcasting and by the at least one base station, the second downlink messages to the first and second group of the user equipments using the broadcasting resources; and
participating, by the at least one base station, in a cooperative relaying scheme at least by transmitting information about the cooperative relaying resources to be used for relaying the second downlink messages at least by user equipments in the first group that successfully decoded the second downlink messages.

9. The apparatus as in claim 8, wherein:
the one or more memories further store instructions that, when executed by the one or more processors, cause the apparatus at least to perform: generating a concatenated message comprising the second downlink messages, wherein transmitting the second downlink messages comprises transmitting the concatenated message via the broadcasting resources, and
the first group of user equipments and/or one or more network nodes are caused to relay concatenated message via the cooperative relaying resources to the second group of the user equipments.

10. The apparatus as in claim 8, wherein the one or more memories further store instructions that, when executed by the one or more processors, cause the apparatus at least to perform: scheduling third resources for communicating first uplink messages from a first uplink group of the user equipments, and fourth resources for communicating second uplink messages from a second uplink group of the user equipments.

11. The apparatus as in claim 10, wherein the third resources are scheduled for receiving the first uplink messages from the user equipments in the first uplink group, and the fourth resources comprise resources for indirectly receiving the second uplink messages from the user equipments in the second uplink group via a combination of broadcasting and cooperative relaying.

12. The apparatus as in claim 11, wherein the one or more memories further store instructions that, when executed by the one or more processors, cause the apparatus at least to perform: transmitting downlink control information indicative of at least one of:

time/frequency resources of the scheduled first, second, third, and/or fourth resources;
an indication of a type of cooperative relaying to be used as part of the cooperative relaying scheme;
an assignment to a relaying group such that second uplink messages and/or second downlink messages are cooperatively relayed between user equipments assigned to the same relaying group;
a list of candidate relay user equipments wherein a second downlink message and/or a second uplink message is relayed only in response to said second downlink message and/or a second uplink message corresponding to a user equipment within the list; or
one or more rules for each of the user equipments to autonomously decide whether to relay a given second uplink message and/or second downlink message.

13. The apparatus as in claim 8, wherein the one or more memories further store instructions that, when executed by the one or more processors, cause the apparatus at least to perform: adapting transmission rates of each of the strongest channels based on the determined strength of the channels to each of the plurality of user equipments in the wireless multi-user network.

14. A method comprising:
receiving, at a first user equipment from at least one base station in a multi-user network comprising a plurality of user equipments, downlink information comprising at least:
an indication of at least one resource scheduled for the first user equipment of a plurality of downlink resources, wherein the plurality of downlink resources comprise first downlink resources configured for communicating first downlink messages to a first downlink group of the user equipments having strongest channels, and second downlink resources for communicating second downlink messages to a second downlink group of the user equipments that are not in the first downlink group, wherein the second resources comprise broadcasting resources and cooperative relaying resources, and
an indication the first user equipment is in the first downlink group;
receiving, at the first user equipment from the at least one base station, the first downlink messages in accordance with the first downlink resources of the downlink information;
the receiving, at the first user equipment from the at least one base station, second downlink messages in accordance with the broadcasting resources of the downlink information;
participating by the first user equipment in a cooperative relaying scheme at least by receiving information from the at least one base station about the cooperative relaying resources to be used for relaying the second downlink messages at least by user equipments in the first group that successfully decoded the second downlink messages, and in response to the first user equipment successfully decoding the second downlink messages, relaying the second downlink messages that were successfully decoded using the cooperative relaying resources.

15. The method as in claim 14, wherein the:
receiving the one or more of the second downlink messages comprises, in response to determining that the first user equipment is in the first downlink group comprises receiving a concatenated message on the broadcasting resources via broadcast, wherein the concatenated message comprises the second downlink messages for the second downlink group of user equipments; and participating by the first user equipment in a cooperative relaying scheme comprises relaying the concatenated message to at least one second user equipment in the second downlink group using the cooperative relaying resources.

16. The method as in claim 14, further comprising:

measuring a channel quality of a channel between the first user equipment and a network node based on a reference signal, and transmitting a report of the channel quality to the network node, wherein the indication of whether the first user equipment is in either the first downlink group or the second downlink group is based at least in part on the report.

17. The method as in claim 14, wherein the plurality of resources further comprises third resources for communicating first uplink messages from a first uplink group of the user equipments, and fourth resources for communicating second uplink messages from a second uplink group of the user equipments, and wherein the method comprises:

transmitting and/or receiving one or more of the first and/or second uplink messages based on determination of whether the first user equipment is in either the first uplink group or the second uplink group.

18. The method as in claim 17, wherein at least one of:

the first uplink group is the same as the first downlink group, or the second uplink group is the same as the second downlink group.

19. The method as in claim 18, wherein at least one of the first uplink group and/or the second uplink group is different than the first downlink group and the second downlink group; and wherein the downlink information is indicative of whether the first user equipment is in either the first uplink group or the second uplink group.

\* \* \* \* \*